W. A. KING.
MOTION PICTURE MACHINE.
APPLICATION FILED AUG. 24, 1914.

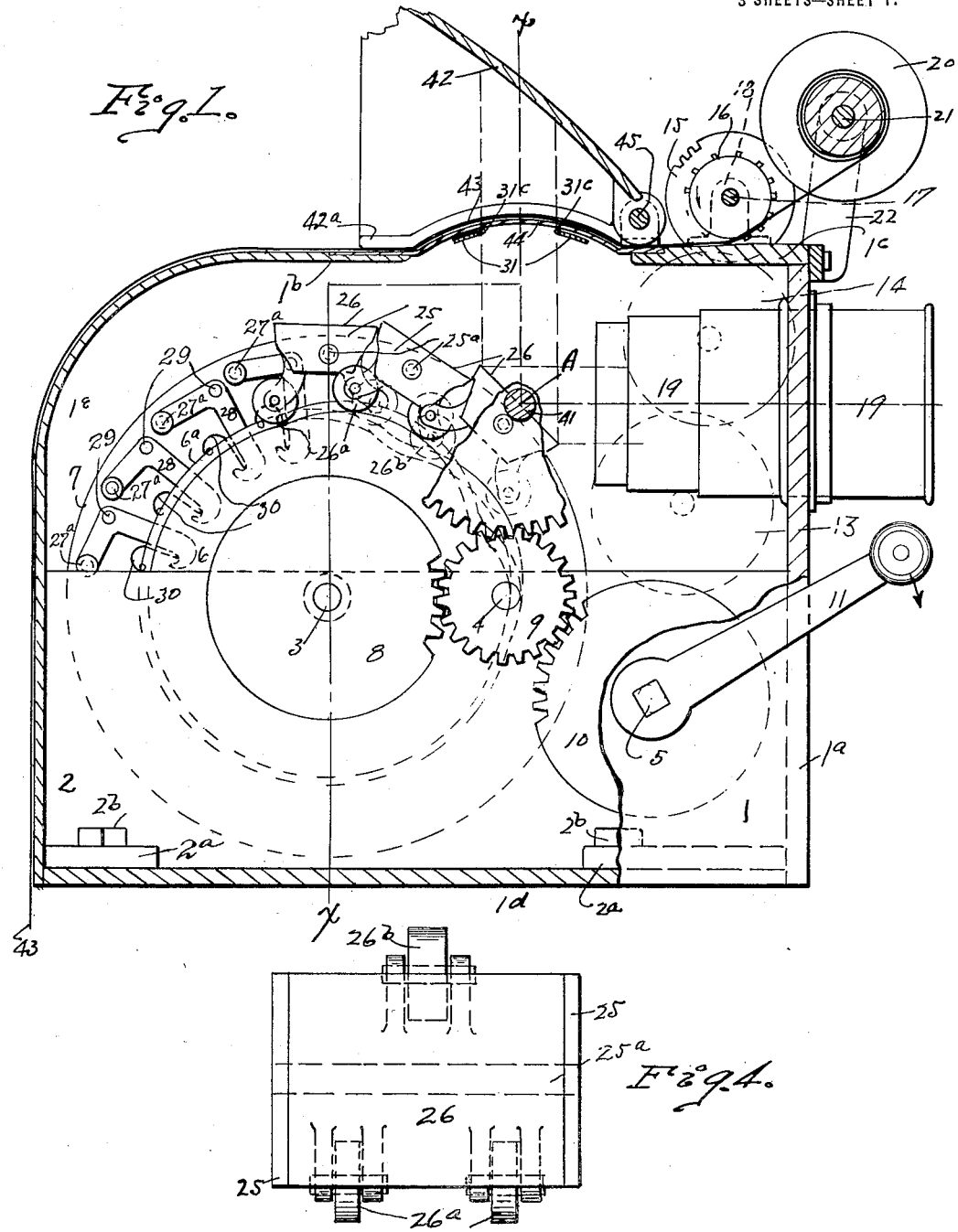

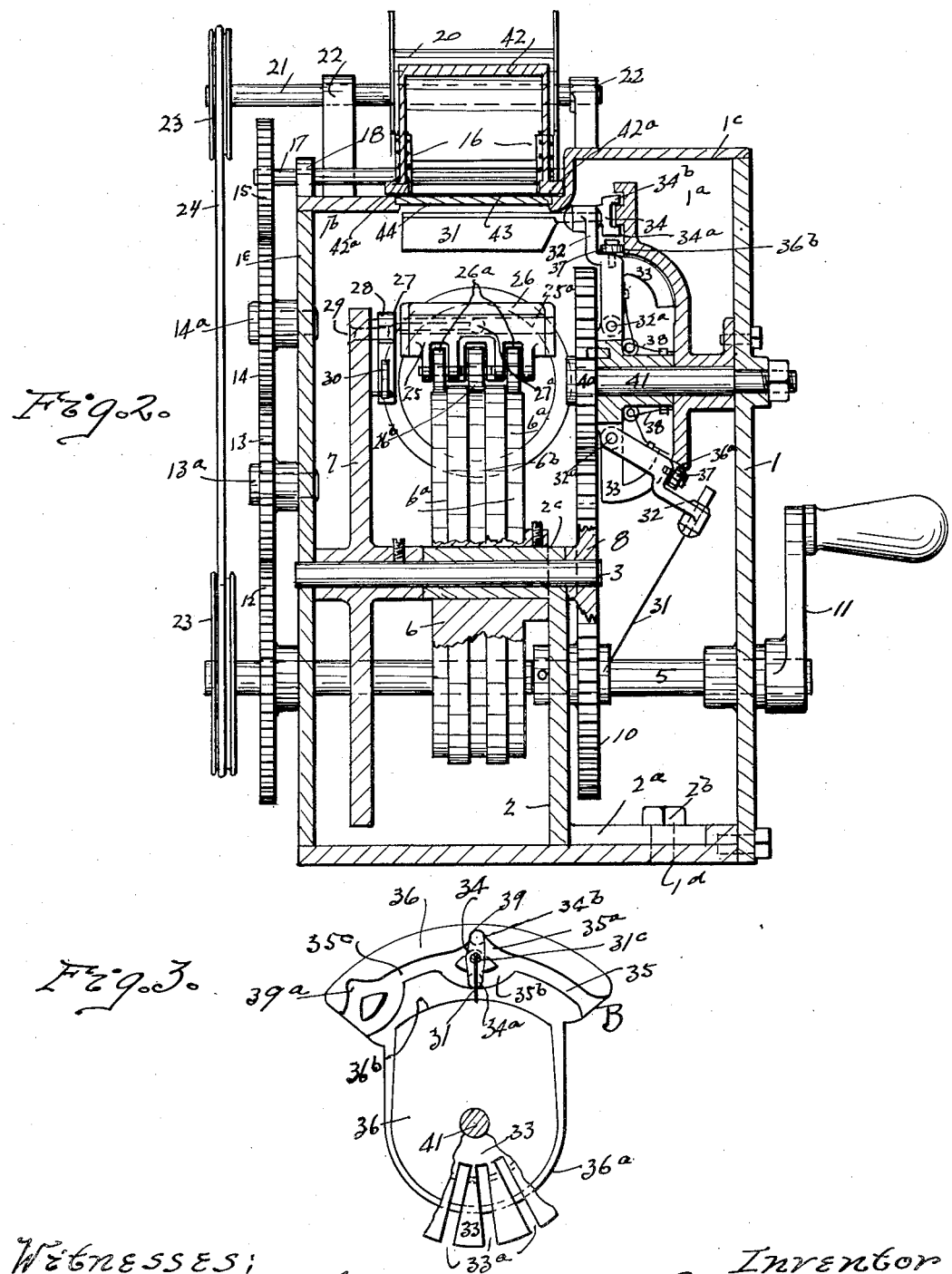

1,224,304.

Patented May 1, 1917.
3 SHEETS—SHEET 3.

Witnesses:
Frank H Fowler
Emma Kroger

Inventor
William A. King.
By Fred P. Gorin,
Attorney

UNITED STATES PATENT OFFICE.

WILLIAM A. KING, OF LA CONNER, WASHINGTON, ASSIGNOR OF ONE-HALF TO WILLIAM CLEMONS, OF SKAGIT COUNTY, WASHINGTON.

MOTION-PICTURE MACHINE.

1,224,304.    Specification of Letters Patent.    Patented May 1, 1917.

Application filed August 24, 1914. Serial No. 858,234.

*To all whom it may concern:*

Be it known that I, WILLIAM A. KING, a citizen of the United States, and a resident of La Conner, in the county of Skagit and State of Washington, have invented certain new and useful Improvements in Motion-Picture Machines, of which the following is a full, true, and exact specification.

My invention relates to motion picture machines and has for its principal object to provide means for giving the films a continuous projection upon the screen, instead of throwing the pictures upon the screen in rapid succession, as is common at the present time. With a continuous projection the usual flicker caused by the rapid change of the pictures upon the screen is obviated. It is a well known fact that such flickering is very injurious to the eyes. A further object of my invention is to provide improved means for trimming the picture upon the screen, that is to say means for cutting off all projections upon the screen other than the desired picture. Other objects will appear as my invention is more fully hereinafter described, illustrated in the accompanying drawings and pointed out in the appended claims.

Figure 5:
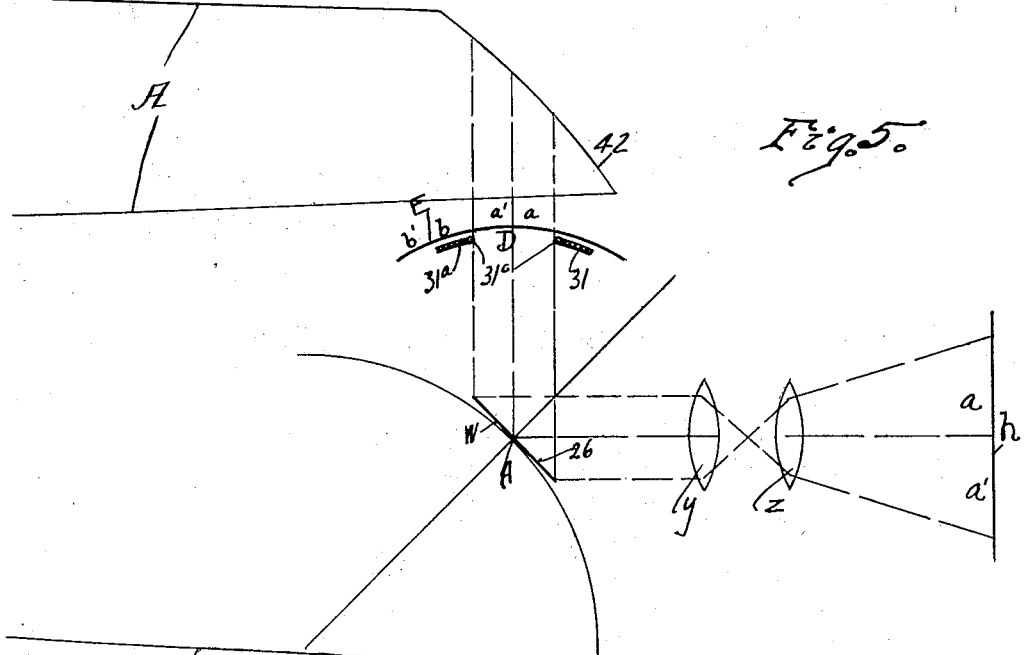
Figure 6:
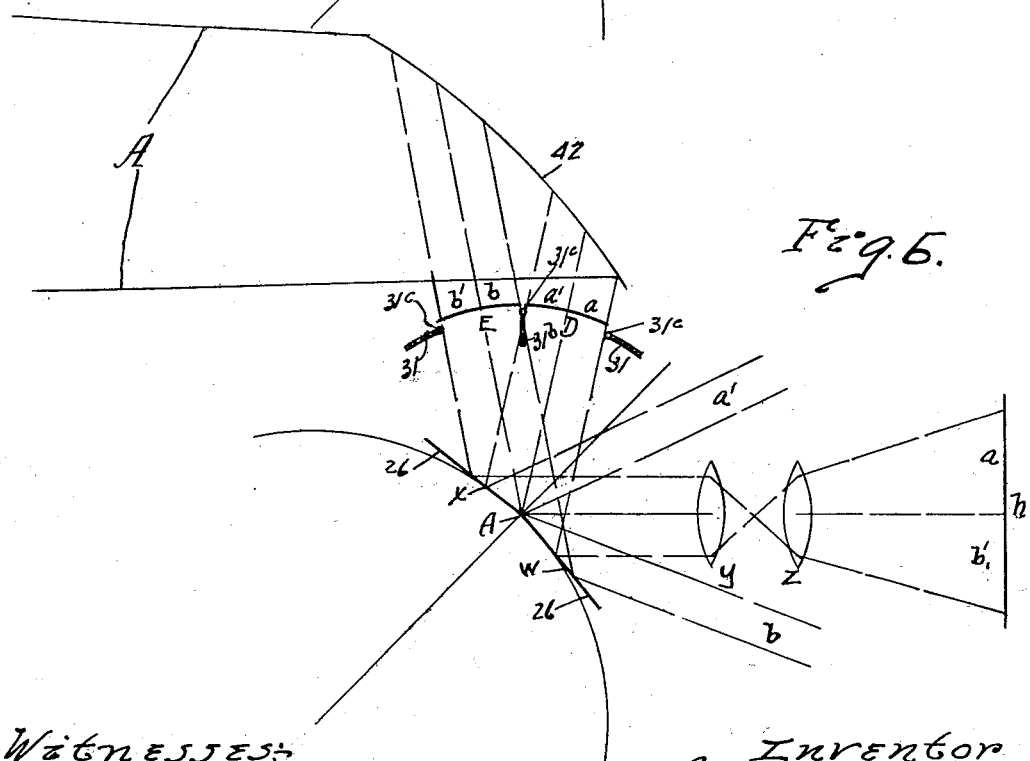

In the drawings, Figure 1 is a side elevation of my device, with the outer covering and certain parts removed and other parts broken away. Fig. 2 is a sectional view upon the lines $x-x$ of Fig. 1, with several duplicate parts omitted for clearness. Fig. 3 is an inside elevation of a cam connecting the parts which operate the shutters, or trimmers. Fig. 4 is a plan view of one of the mirror carriages. Fig. 5 is a diagrammatic elevation showing the passage of light rays through a single picture and its projection upon the screen. Fig. 6 is a similar view showing passage of light rays through two pictures.

Referring now more particularly to the drawings, reference numerals 1, $1^a$, $1^b$, $1^c$, $1^d$, $1^e$ designate frame pieces which are bolted or otherwise suitably secured together; 2, is an inner frame piece which is secured to the piece $1^d$ by lugs $2^a$ and bolts $2^b$. Shafts 3, 4, and 5 take bearing in the inner frame 2 and the outer frame $1^e$. The shaft 5 also takes bearing in frame 1. Shaft 3 passes through a sleeved bearing $2^c$ and frame 2. Mounted upon the said sleeve is a 3-track cam 6 of the form shown, and having grooves $6^a$ and $6^b$. Mounted upon the shaft 3 and secured thereto is a disk 7. The shaft 3 is driven by a train of gears 8, 9 and 10 on the shafts 3, 4 and 5 respectively, and a handle 11 on the shaft 5 is adapted for hand operation. Gears 12, 13, 14 and 15 form a train which drives the film feed rolls 16, the gears 12 and 15 being attached to shafts 5 and 17 respectively. Gears 13 and 14 are revolubly mounted upon studs $13^a$ and $14^a$ respectively, which are mounted in the outer frame-piece $1^e$. The shaft 17 is mounted in bearing 18 attached to casing member $1^c$. A lens tube 19 is set in the casing $1^a$. A film reel 20 is mounted upon the shaft 21, revolving in bearings 22. Attached to shafts 21 and 5 are pulleys 23 upon which runs an endless belt 24, and the said belt drives the film reel. Mirror carriages 25, upon which are mounted mirrors 26 (only a few of the said carriages being shown) revolve upon the cam 6. Wheels $26^a$ and $26^b$ of the mirror carriages ride in the grooves $6^a$ and $6^b$ respectively. The cams are so arranged and disposed that their effect is such that the image upon the film is at all times substantially reflected upon a predetermined surface upon the screen, despite variation in the angle of incidence with respect to the mirrors; that is to say, as seen in Fig. 6, the $a$ half and the $b'$ half of pictures D and E respectively are reflected upon the screen in such position as to form one complete picture, as will be more fully described later. The mirror carriages are rotated about the cam face by the disk 7, to which they are attached as follows—an aperture $25^a$ pierces each carriage and half way through the said aperture projects the pin 27 having a ball $27^a$ on its inner end. The other end of the said pin is attached to a bell crank lever 28 as shown. The said crank is secured to the disk 7 by a pin 29, the end of said crank being held by a spring 30, one end of which is attached to the said lever and the other end is attached to the disk 7. As the disk 7 revolves the carriages are carried along with it by the pin 27 and ball 29. The spring 30 will at all times tend to rotate the lever 28 about the point 27ª, which tendency is resisted by the carriage 25, which is riding in the grooves of the cam 6, the result being that the carriages are at all times held snugly to the grooves in the said cam. Shutters 31 may be provided whose function is to cut off any rays of light which might pass through the film at either end of the picture, and are revolubly mounted in arms 32, which are connected by the pin 32ª to a spider 33 having slots 33ª within which the said arms work. The other ends of the shutters 31 terminate in shuttles 34, which have projections 34ª and 34ᵇ, the said projections being adapted to ride in grooves 35 of a cam 36. The said cam also has circular and spherical faces 36ª and 36ᵇ upon which the rollers 37 ride, and the said rollers are attached to the arms 32. A spring 38 draws the arms and rollers in against the cam face at all times. The cam is held stationary, and is of such shape that when the rollers ride around its face they are forced outwardly at the top of their travel until the trimmers 31 assume positions parallel to the top or bottom of the pictures on the film; that is, in position to trim the bottom of the picture as shown at 31ª Fig. 5. The upper shutetr 31 shown in Fig. 2 is in the position shown by 31ᵇ in Fig. 6. While the shutters are passing through the field of light their speed is the same as that of the film, and they have a width equal to one-half the length of a picture on the film and are so spaced that their center lines of rotation 31ᶜ (see Figs. 5 and 6) stand directly beneath the lines between successive pictures on the film. When the shuttle 34 has reached the point B (Fig. 3) the projection 34ᵇ enters the groove 35. The projection 34ª also follows into the groove 35. When in this position the shutter is held parallel with the film as at 31ª Fig. 5. As the shutter moves forward the projection 34ᵇ takes the upper groove 35ª, thus tipping the projection 34ª into the groove 35ᵇ. When the projection 34ᵇ strikes the pocket 39 said projection is brought to a temporary stop, thus allowing the projection 34ª to continue in motion, thereby rotating the shutetr through an approximate angle of 180°. During this rotation the shutter 31 has changed from a position under the forward half of a given picture on the film to a position under the rear half of the picture immediately in front of the given picture. The three successive positions of the shutter are shown by the position of the shutters in Fig. 6. As the projection 34ª moves forward in the groove 35ᶜ it in turn passes upward into the depression 39ª, thus allowing the shutter to be rotated as above described, thereby returning said shutter to its original position. Rotary motion for the shutters is transmitted from the shaft 4 and gear 9 to the gear 40 and shaft 41, thence to the spider 33 (which is secured to the gear 40), both of which revolve on the shaft 41. Light from the usual source strikes a reflector 42 from which it is reflected downwardly through a film 43 and a transparent plate 44 until it strikes the mirror 26, thence the light is reflected into the lenses within the lens tube 19. The shape of the reflector 42 is such that no matter in what position of its travel the picture on the film may be, the effective rays of light which pass through the transverse center line of the said picture will strike the mirror on a central reflection line. The edges of the film pass between the transparent plate 44 and the ledges 42ª of the reflector, the latter being hinged as at 45.

The operation of my device is as follows— When the various parts of my machine are set in motion, as already described, by turning the handle 11 in the direction of the arrow in Fig. 1 the film rolls 16 draw the film 43 continuously along the top of the transparent plate 44, the film being wound upon the reel 20 as it leaves the film roll. The speed of the film is synchronized with that of mirrors 26 and shutters 31. As one of the pictures of the film occupies the central portion of the light, as in Figs. 1 and 5, it is thrown full upon the screen. Referring more particularly to the diagrammatic Fig. 5, it will be seen that a portion of the light which strikes the reflector 42 is thrown through the two halves a and a' of the picture D and strikes the mirror w and is reflected through the lenses y and z, which transpose the image upon the screen h, thus placing the halves a and a' in proper position. As the picture D moves forward to the position shown in Fig. 6, and the following picture E also comes within the field of light, it will be seen that light passes through both pictures on the film. The mirror w has also moved forward until its rear edge coincides with the central line of reflection A. The mirror x has also moved forward until its forward edge coincides with the said central line of reflection. The mirrors w and x have also been tilted by the action of the cam tracks 6ª and 6ᵇ, as previously explained. The light passing through the forward or a half of picture D still strikes the mirror w and is reflected into the lenses and out upon the screen as before, while the a' or rear half of the picture is reflected from the mirror x at such an angle that it does not strike the lenses and therefore does not appear upon the screen h. The light which passes through the forward or b half of the picture E also strikes the mirror w and is reflected at such an angle that it does not strike the lenses at all, and therefore does not appear upon the screen h, while the light which passes through the rear or b' half of said picture strikes the mirror $x$ at such an angle that it is reflected through the lenses and onto the screen $h$. It is thus seen that the picture upon the screen is made up from the forward half of one picture D on the film and the rear half of the following picture E on the film. It will also be noted that the remaining parts of both pictures cast no reflections through the lenses, therefore the shutter $31^b$ is in a dead space as far as its use is concerned, and is free to turn as above described without intercepting the light which is reflected through the lenses.

From the foregoing it is believed that the construction and operation of my device will be readily understood by others skilled in the art, and while I have shown a particular form of embodiment of my invention I am aware that many minor changes therein will readily suggest themselves to others skilled in the art without departing from the spirit and scope of the invention, and I therefore desire to avoid being limited to the exact form shown and described except as pointed out in the appended claims.

Having described my invention, what I claim as new and desire to protect by Letters Patent is—

1. In a motion picture projector comprising an outer casing, the usual picture films and mechanism for continuously actuating the films, and a lens tube, the combination of means for producing a continuous projection upon the usual picture screen, the said means including independent cam tracks and an endless belt or carriage upon which mirrors are mounted, means for moving the same around upon the cam track, and a reflector which reflects the light through the pictures on the film and successively upon the moving mirrors, the cams in the cam tracks being so shaped as to independently and automatically cant the ends of one mirror with respect to its adjacent mirror at a predetermined angle at or about the time it reaches the point of concentration of light from the reflector, whereby the rays of light from the reflectors which pass through the forward end of one of the said pictures and certain rays from the said reflector which pass through the rear end of the following picture are reflected from the mirrors into the lens tube and the remaining rays which pass through the said pictures, strike the inclined mirrors at an angle which in the case of the forward picture is too obtuse to reflect the said rays into the lens tube and in the case of the following picture is too acute to reflect the rays into the lens tube, whereby a complete picture is projected at all times, shutters for trimming the pictures, means for causing the said shutters to continuously revolve about a common center, and synchronously with the mirrors and means for causing the said shutters to each in turn rotate axially when they are centrally within the path of the rays of light which have passed through the rear end of the forward picture and the forward end of the following picture and which are deflected away from the lens tube.

2. The combination in a motion picture projector comprising an outer casing, lens tube, film feed rolls and means for continuously actuating the films of a reflector which is adapted to continuously reflect the light through the moving film, wheeled mirror carriages connected in endless belt form and which travels in a vertical plane, and mirrors thereon, a three-way circular cam-track, upon which the said carriages ride, the cam-track being so arranged that the outer tracks of the three-way cam-track control the movement of the forward ends of the carriages and the central track controls the movement of the rear ends thereof and each mirror is automatically tilted at a predetermined angle at or about the time it reaches the point of concentration of light from the reflector, whereby the rays of light from the reflector which pass through the forward end of one of the pictures upon said films and certain rays from the said reflectors which pass through the rear end of the following picture, are reflected from the mirrors into the lens tube and the remaining rays which pass through the said pictures strike the inclined mirrors at an angle which in the case of the forward picture is too obtuse to reflect the rays into the lens tube and in the case of the following picture is too acute to reflect the rays into the lens tube, and a complete picture is projected at all times; shutters for trimming the pictures, means for causing the said shutters to continuously revolve about a common center, and synchronously with the wheeled mirror carriages, and means for causing said shutters to each in turn rotate axially when they are centrally within the path of the rays of light which have passed through the rear end of the forward picture and the forward end of the following picture and which are deflected away from the lens tube.

3. The combination in a motion picture projector, comprising an outer casing, lens tube, a reflector, film feed rolls and means for continuously actuating the films, of a plurality of mirrors mounted upon an endless belt, means for moving said belt in a vertical plane, the said mirrors being adapted to receive the light from the reflector, a cam-track which tilts the mirrors at a predetermined point, trimming shutters, shutter revolving means which revolves said shutters about a common center and synchronously with the said mirrors, the said shutters intermittently obstructing certain of the light rays, shutter rotating means which include cam and coacting projections for causing the shutters to also rotate axially when they are centrally within the path of the rays of light which have passed through the rear end of the forward picture and the forward end of the following picture and which are deflected away from the lens tube.

WILLIAM A. KING.

Witnesses:
   FRED P. GORIN,
   EMMA KROGER.